(12) United States Patent
Son (10) Patent No.: US 11,199,218 B2
(45) Date of Patent: Dec. 14, 2021

(54) RACK BUSH OF STEERING DEVICE FOR VEHICLE

(71) Applicant: HYUNDAI MOBIS CO., LTD., Seoul (KR)

(72) Inventor: Chang Wook Son, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/817,391

(22) Filed: Mar. 12, 2020

(65) Prior Publication Data

US 2020/0386266 A1 Dec. 10, 2020

(30) Foreign Application Priority Data

Jun. 4, 2019 (KR) ........................ 10-2019-0065886

(51) Int. Cl.
*F16C 35/02* (2006.01)
*F16C 17/08* (2006.01)
*B62D 3/12* (2006.01)

(52) U.S. Cl.
CPC .............. *F16C 17/08* (2013.01); *B62D 3/126* (2013.01); *F16C 35/02* (2013.01); *F16C 2326/24* (2013.01)

(58) Field of Classification Search
CPC ........ F16C 17/02; F16C 27/02; F16C 27/063; F16C 29/02; F16C 35/02; F16C 2326/24; F16C 17/08; B62D 3/12; B62D 3/126
See application file for complete search history.

(56) References Cited

U.S. PATENT DOCUMENTS

| 1,674,623 | A  | * | 6/1928 | Claus ....................... B62D 1/16 74/490 |
| 2010/0251839 | A1 | * | 10/2010 | Kim ...................... F16C 27/063 74/29 |
| 2010/0278467 | A1 | * | 11/2010 | Hirose .................. F16C 29/002 384/283 |
| 2015/0204381 | A1 | * | 7/2015 | Zaike ...................... F16C 29/02 384/202 |
| 2016/0160913 | A1 | * | 6/2016 | Cooper ................... F16C 23/04 74/422 |

FOREIGN PATENT DOCUMENTS

| JP | 2002-114162 A | 4/2002 |
| JP | 2006-234152 A | 9/2006 |
| JP | 2017067220 A * | 4/2017 ............ F16C 29/002 |
| KR | 10-0452299 B1 | 10/2004 |
| KR | 10-2009-0121916 A | 11/2009 |

OTHER PUBLICATIONS

Office Action of corresponding Korean Patent Application No. 10-2019-0065886—5 pages (Jul. 13, 2020).
Office Action of corresponding Korean Patent Application No. 10-2019-0065886—5 pages (Mar. 26, 2020).

* cited by examiner

*Primary Examiner* — Phillip A Johnson
(74) *Attorney, Agent, or Firm* — DLA Piper LLP (US)

(57) ABSTRACT

A rack bush of a steering device for a vehicle may include: a bush body part installed in a rack housing of the steering device for a vehicle so as to cover a rack bar, and configured to guide the rack bar to move in an axial direction; a first uneven part formed in an uneven shape on an outer circumferential surface of the bush body part, and configured to bring the bush body part and the rack housing into line contact with each other; and a position fixing part formed at one end of the bush body part, and configured to prevent the bush body part from moving in the axial direction.

11 Claims, 9 Drawing Sheets

RACK BUSH OF STEERING DEVICE FOR VEHICLE

CROSS-REFERENCE TO RELATED APPLICATION

The present application claims priority under 35 U.S.C. § 119(a) to Korean Patent Application No. 10-2019-0065886 filed on Jun. 4, 2019 in the Korean Intellectual Property Office, which is incorporated herein by reference in its entirety.

BACKGROUND

1. Technical Field

Embodiments of the present disclosure relate to a rack bush of a steering device for a vehicle, and more particularly, to a rack bush of a steering device for a vehicle, which has an uneven part applied to the outer circumferential surface thereof and an O-ring mounted on the circumference of the uneven part, and can reduce deformation, noise and vibration of the rack bar in a low-load region, and damp an impact transferred to the rack bar and reduce noise in a high-load region.

2. Related Art

In general, a steering device refers to a device that enables a driver to change the traveling direction of a vehicle according to the driver's will. The steering device arbitrarily changes the center of rotation at which the front wheels of the vehicle are rotated, and thus assists the driver to steer the vehicle in a direction desired by the driver.

A gear box includes a rack housing installed at the bottom thereof and a valve housing installed at the top thereof so as to be coupled to the rack housing, and the rack housing and the valve housing constitute the exterior of the gear box. The valve housing includes an input shaft and a pinion shaft which are installed therein. The input shaft receives a rotational force generated by a driver through a steering wheel, and is rotated in the valve housing by the rotational force. The pinion shaft is connected to the bottom of the input shaft so as to be interlocked to the input shaft, has a pinion gear formed on the outer circumferential surface thereof, and is extended to the inside of the rack housing.

The rack housing includes a rack bar and a rack bar support device which are installed therein. The rack bar is a round rod elongated in an axial direction, and has a rack gear formed on one side of the middle thereof, connected to a pinion gear of the rack housing, and configured to switch a rotary motion into a linear motion. The rack bar support device is installed on the opposite side of the rack gear, and can elastically support the rack bar toward the pinion gear.

In the gear box, a rack bush for supporting the rack bar is an important part that has an influence on a gear friction force, noise performance and the like, and requires support stiffness, damping performance and the like.

The conventional rack bush has a structure in which only an O-ring is installed for a damping function. However, when only the O-ring is installed, the damping function may be lost in a high load region. While the damping function is lost, an impact applied from the rack bar to the rack bush may not be normally absorbed.

The related art of the present disclosure is disclosed in Korean Patent No. 452299 registered on Oct. 1, 2004 and entitled "Rack Bush and Rack Stopper of Steering Device".

SUMMARY

Various embodiments are directed to a rack bush of a steering device for a vehicle, which has an uneven part applied to the outer circumferential surface thereof and an O-ring mounted on the circumference of the uneven part, and can reduce deformation, noise and vibration of the rack bar in a low-load region, and damp an impact transferred to the rack bar and reduce noise in a high-load region.

In an embodiment, a rack bush of a steering device for a vehicle may include: a bush body part installed in a rack housing of the steering device for the vehicle so as to cover a rack bar, and configured to guide the rack bar to move in an axial direction; a first uneven part formed in an uneven shape on an outer circumferential surface of the bush body part, and configured to bring the bush body part and the rack housing into line contact with each other; and a position fixing part formed at one end of the bush body part, and configured to prevent the bush body part from moving in the axial direction.

The first uneven part may be formed in a wave shape in a circumferential direction of the bush body part, and have a plurality of first protrusions brought into line contact with an inside of the rack housing.

The first uneven part may be made of an elastically deformable material to change a distance between the first protrusions adjacent to each other.

The first uneven part may have a first groove between the first protrusions adjacent to each other.

The first uneven part may be formed as one body with the bush body part.

The rack bush may further include a second uneven part formed in an uneven shape on the inner circumferential surface of the bush body part, and configured to bring the bush body part and the rack bar in line contact with each other.

The second uneven part may be formed in a wave shape in a circumferential direction of the bush body part, and have a plurality of second protrusions brought into line contact with an outer circumferential surface of the rack bar.

The second uneven part may be made of an elastically deformable material to change a distance between the second protrusions adjacent to each other.

The second uneven part may have a second groove between the second protrusions adjacent to each other.

The second uneven part is formed as one body with the bush body part.

An O-ring may be installed on the bush body part so as to protrude to the outside more than the first uneven part.

The bush body part may have an installation groove formed on the outer circumferential surface thereof, such that the O-ring is installed in the installation groove.

In accordance with the embodiment of the present disclosure, the rack bush may have a structure in which the uneven part is applied to the outer circumferential surface and the O-ring is mounted on the circumference of the uneven part, and thus can improve the deformation, noise and vibration of the rack bar in a low load region.

Furthermore, the rack bush may have a structure in which the uneven part is applied to the outer circumferential surface and the O-ring is mounted on the circumference of the uneven part, and thus can damp an impact transferred to the rack bar and reduce noise in a high load region.

DETAILED DESCRIPTION

Hereinafter, a rack bush of a steering device for a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
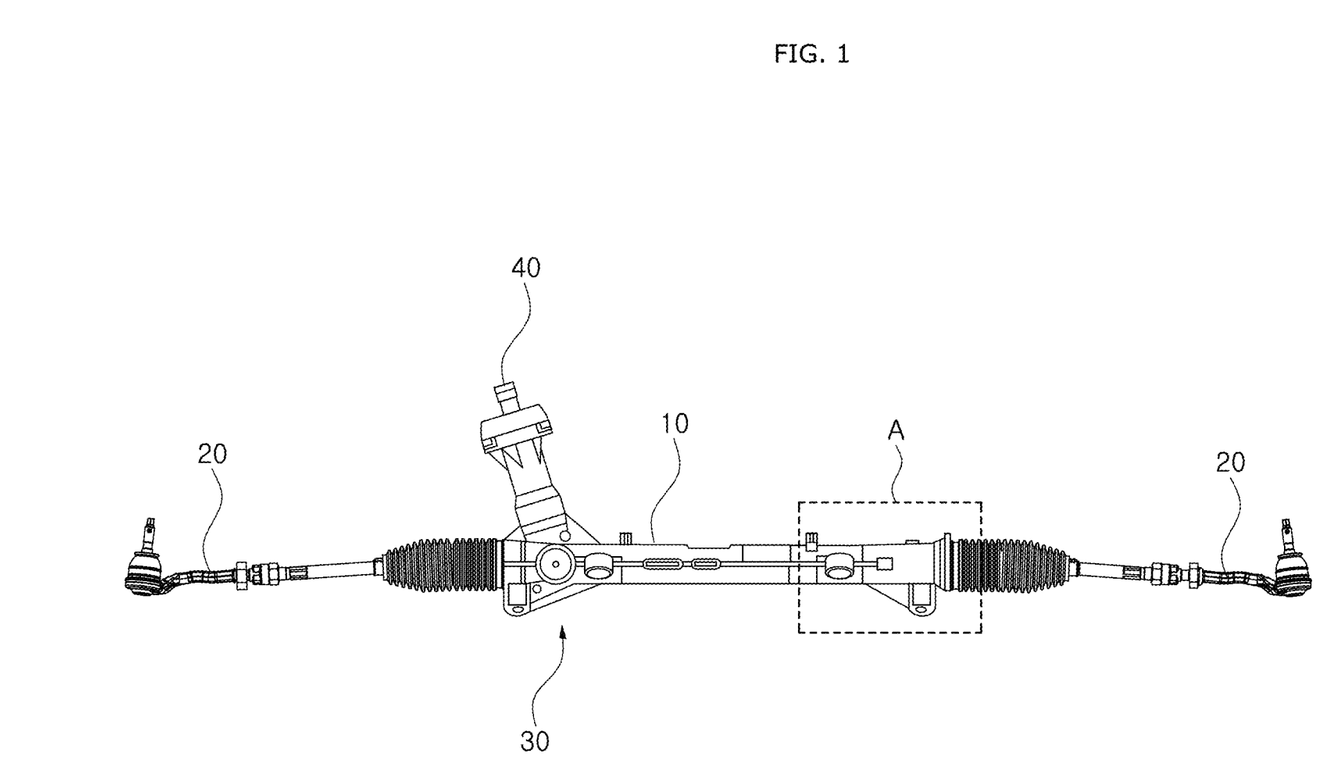
FIG. 1 is a perspective view of a steering device for a vehicle, in which a rack bush of a steering device for a vehicle in accordance with an embodiment of the present disclosure is installed.
Figure 2:
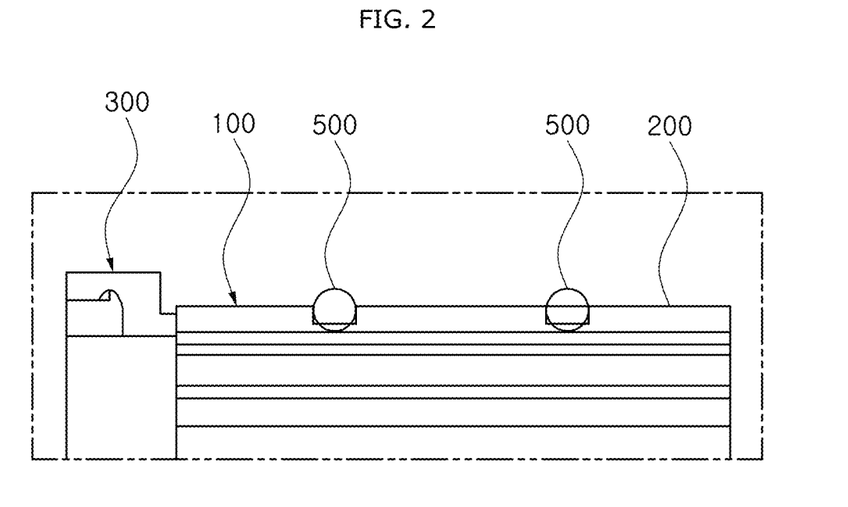
FIG. 2 is a cross-sectional view of main parts of the steering device for a vehicle, illustrating a portion A of FIG. 1.
Figure 3:
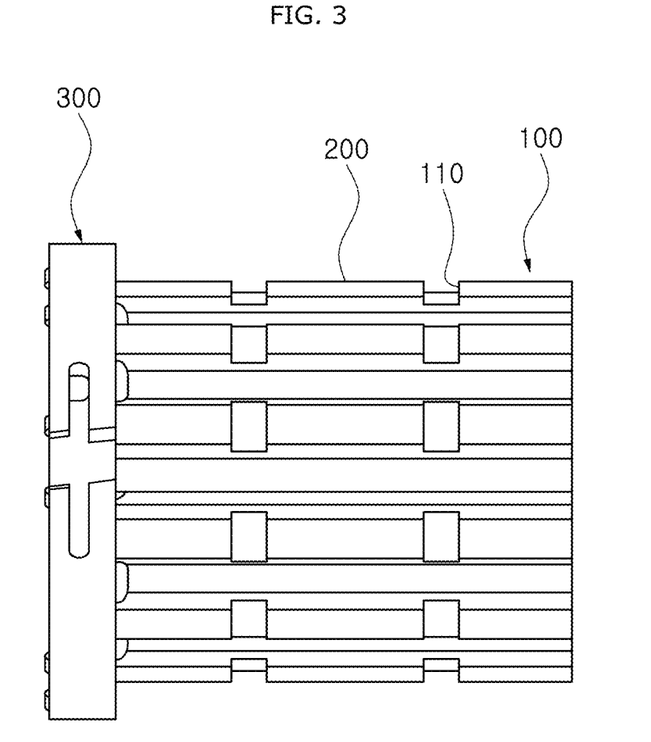
FIG. 3 is a side cross-sectional view illustrating the rack bush of the steering device for a vehicle in accordance with the embodiment of the present disclosure.
Figure 4:
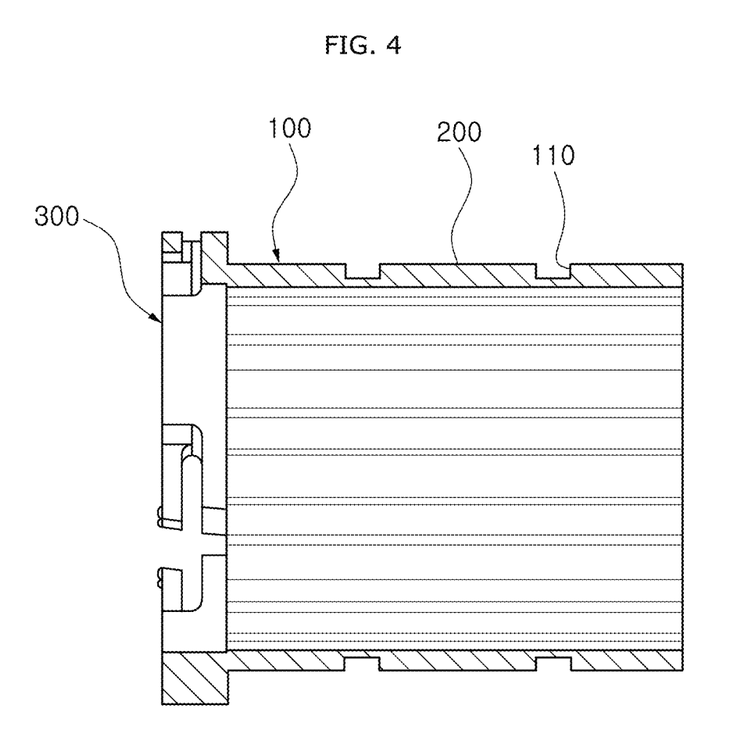
FIG. 4 is a side cross-sectional view illustrating the rack bush of the steering device for a vehicle in accordance with the embodiment of the present disclosure.
Figure 5:
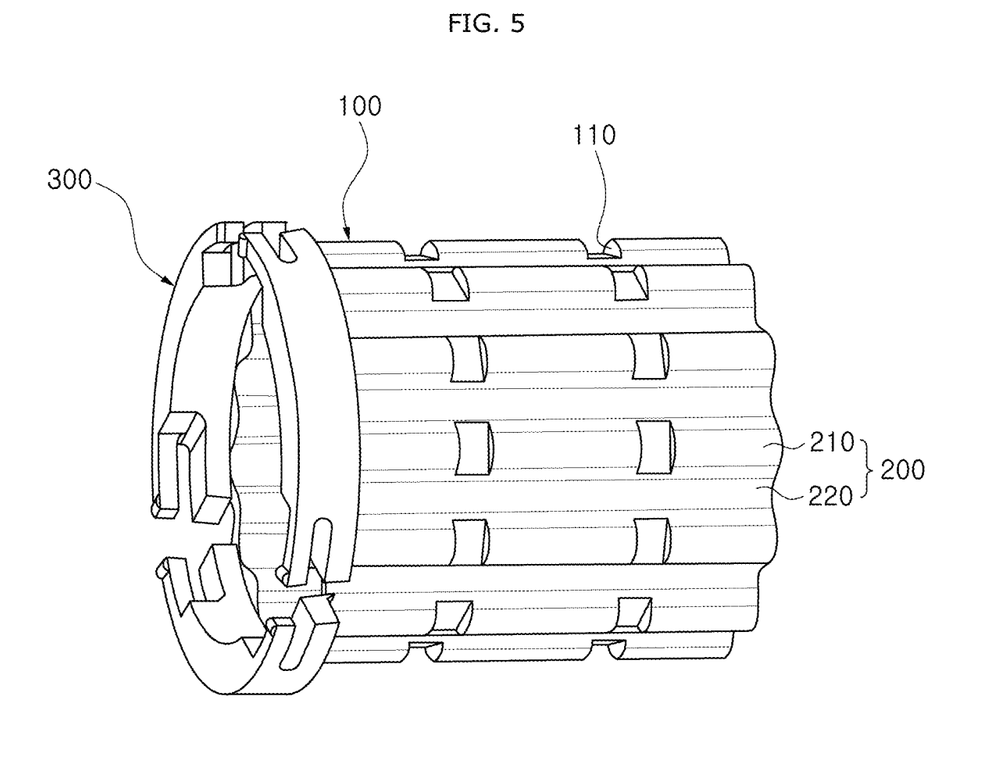
FIG. 5 is a perspective view illustrating the rack bush of the steering device for a vehicle in accordance with the embodiment of the present disclosure.
Figure 6:
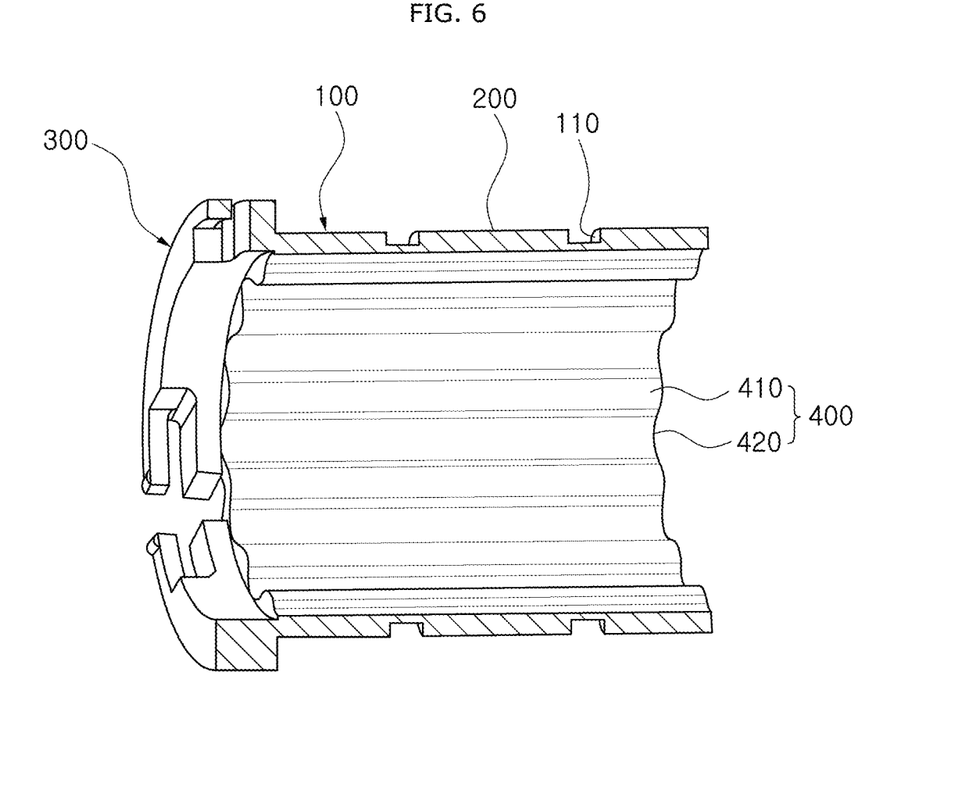
FIG. 6 is a cross-sectional perspective view illustrating the rack bush of the steering device for a vehicle in accordance with the embodiment of the present disclosure.
Figure 7:
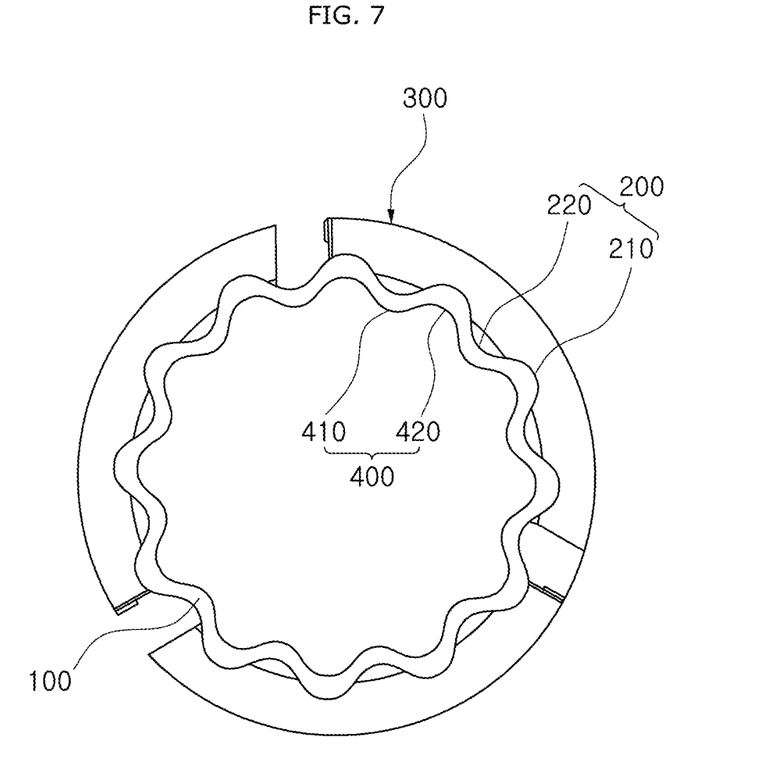
FIG. 7 is a front view illustrating the rack bush of the steering device for a vehicle in accordance with the embodiment of the present disclosure.
Figure 8:
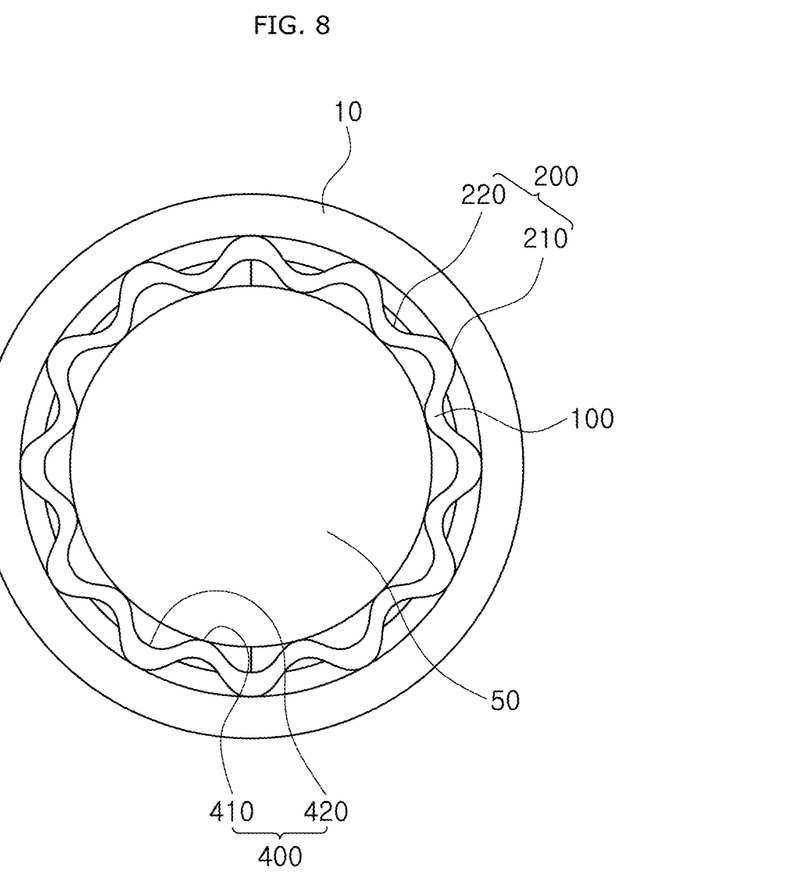
FIG. 8 is a cross-sectional view illustrating that the rack bush of the steering device for a vehicle in accordance with the embodiment of the present disclosure is installed in a rack housing while covering a rack bar.
Figure 9:
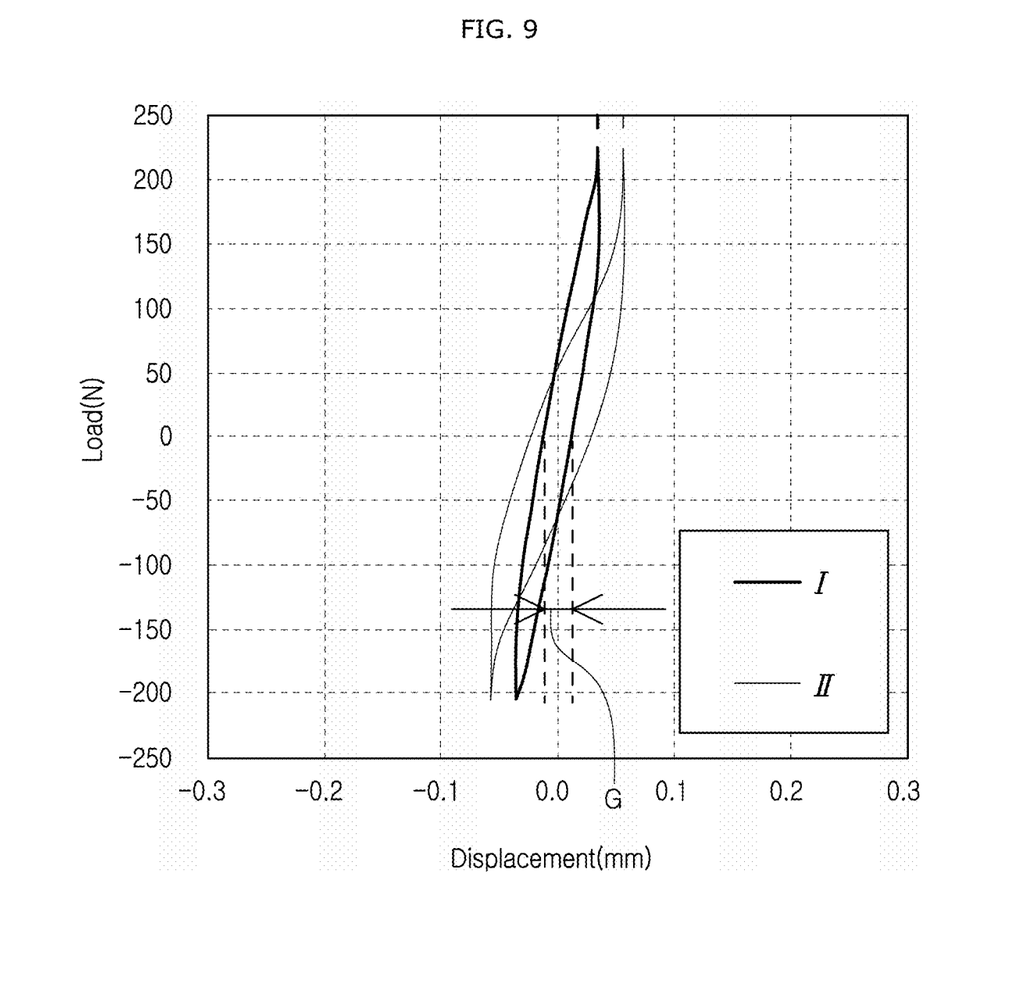
FIG. 9 is a graph comparatively illustrating results obtained by measuring radial stiffness of the rack bush of the steering device for a vehicle in accordance with the embodiment of the present disclosure and radial stiffness of a conventional rack bush.

FIG. 1 is a perspective view of a steering device for a vehicle, in which a rack bush of a steering device for a vehicle in accordance with an embodiment of the present disclosure is installed, FIG. 2 is a cross-sectional view of main parts of the steering device for a vehicle, illustrating a portion A of FIG. 1, FIG. 3 is a side cross-sectional view illustrating the rack bush of the steering device for a vehicle in accordance with the embodiment of the present disclosure, FIG. 4 is a side cross-sectional view illustrating the rack bush of the steering device for a vehicle in accordance with the embodiment of the present disclosure, FIG. 5 is a perspective view illustrating the rack bush of the steering device for a vehicle in accordance with the embodiment of the present disclosure, FIG. 6 is a cross-sectional perspective view illustrating the rack bush of the steering device for a vehicle in accordance with the embodiment of the present disclosure, FIG. 7 is a front view illustrating the rack bush of the steering device for a vehicle in accordance with the embodiment of the present disclosure, FIG. 8 is a cross-sectional view illustrating that the rack bush of the steering device for a vehicle in accordance with the embodiment of the present disclosure is installed in a rack housing while covering a rack bar, and FIG. 9 is a graph comparatively illustrating results obtained by measuring radial stiffness of the rack bush of the steering device for a vehicle in accordance with the embodiment of the present disclosure and radial stiffness of a conventional rack bush.

FIG. 1 illustrates a steering device for a vehicle, in which a rack bush of a steering device for a vehicle in accordance with an embodiment of the present disclosure is installed.

The steering device for a vehicle includes a pinion gear 40, a rack housing 10, and a steering gear box 30 which is installed in the rack housing 10 and converts a rotational force, generated by an operation of a steering wheel (not illustrated), into a linear motion of a rack bar 50 (see FIG. 8).

The pinion gear 40 is rotated in connection with the steering wheel, and moves the rack bar 50 housed in the rack housing 10 in a side-to-side direction.

The rack bar 50 has tie rod ends 20 installed at both ends thereof. The tie rod ends 20 connect the rack bar 50 to wheels (not illustrated) such that the wheels are rotated according to the movement of the rack bar 50, thereby steering the vehicle.

The rack bush of the steering device for a vehicle in accordance with the embodiment of the present disclosure is installed inside both ends of the rack housing 10 so as to cover the rack bar 50, and guides the rack bar 50 to move in the axial direction.

Referring to FIGS. 2 to 8, the rack bush of the steering device for a vehicle in accordance with the embodiment of the present disclosure is installed in the rack housing 10 of the steering device for a vehicle so as to cover the rack bar 50.

The rack bush for the steering device for a vehicle includes a bush body part 100, a first uneven part 200 and a position fixing part 300. The bush body part 100 serves to guide the rack bar 50 to move in the axial direction (hereafter, also referred to as 'longitudinal direction'). The first uneven part 200 is formed in an uneven shape on the outer circumferential surface of the bush body part 100, and thus brings the bush body part 100 and the rack housing 10 into line contact with each other. The position fixing part 300 is formed at one end of the bush body part 100 and serves to prevent the bush body part 100 from moving in the axial direction.

The bush body part 100 is formed in a round pipe shape to cover the rack bar 50 formed in a round rod shape.

The first uneven part 200 is formed in a wave shape in the circumferential direction of the bush body part 100, and has a plurality of first protrusions 210 brought into line contact with the inside of the rack housing 10. Between the first protrusions 210 adjacent to each other, a first groove 220 is formed.

The first uneven part 200 is made of an electrically deformable material such that the distance between the first protrusions 210 adjacent to each other can be changed. As the first uneven part 200 has a structure in which the distance between the first protrusions 210 can be changed, the rack bush can be assembled even when the tolerance of the rack bar 50 and the inner diameter of the rack housing 10 are changed. Furthermore, the rack bush can be effectively assembled even under a mass production condition in which tolerance is considered, and the support stiffness can be improved.

Since the plurality of first protrusions 210 formed on the first uneven part 200 are brought into line contact with the inside of the rack housing 10, a plurality of support points may be formed between the bush body part 100 and the rack housing 10. Such a line contact can solve the problem of the related art in which a frictional force is increased inside the steering gear box 30.

Since the plurality of first protrusions 210 formed on the first uneven part 200 are brought into line contact with the inside of the rack housing 10, the first protrusions 210 form pre-pressure toward the rack housing 10 with an O-ring to be described below, when the rack bush is assembled. Thus, when a radial load is applied to the bush body part 100, the support stiffness can be improved.

The first uneven part 200 may be formed separately from the bush body part 100. As illustrated in the drawings, however, the first uneven part 200 may be formed as one body with the bush body part 100, in order to shorten the manufacturing process.

The rack bush of the steering device for a vehicle in accordance with the embodiment of the present disclosure may further include a second uneven part 400 which is formed in an even shape on the inner circumferential surface of the bush body part 100, and thus brings the bush body part 100 and the rack bar 50 into line contact with each other.

The second uneven part 400 is formed in a wave shape in the circumferential direction of the bush body part 100, and has a plurality of second protrusions 410 brought into line contact with the outer circumferential surface of the rack bar 50. Between the second protrusions 410 adjacent to each other, a second groove 420 is formed.

The second uneven part 400 is made of an electrically deformable material such that the distance between the second protrusions 410 adjacent to each other can be changed.

As the second uneven part 400 has a structure in which the distance between the second protrusions 410 can be changed, the rack bush can be assembled even when the tolerance of the rack bar 50 and the inner diameter of the rack housing 10 are changed. Furthermore, the rack bush can be effectively assembled even under a mass production condition in which tolerance is considered, and the support stiffness can be improved.

Since the plurality of second protrusions 410 formed on the second uneven part 400 are brought into line contact with the outer circumferential surface of the rack bar 50, a plurality of support points may be formed between the bush body part 100 and the rack bar 50. Such a line contact can solve the problem of the related art in which a frictional force is increased in the steering gear box 30.

Since the plurality of second protrusions 410 formed on the second uneven part 400 are brought into line contact with the outer circumferential surface of the rack bar 50, the second protrusions 410 form pre-pressure toward the rack bar 50, when the rack bush is assembled. Thus, when a radial load is applied to the bush body part 100, the support stiffness can be improved.

The second uneven part 400 may be formed separately from the bush body part 100. As illustrated in the drawings, however, the second uneven part 400 may be formed as one body with the bush body part 100, in order to shorten the manufacturing process.

The O-ring 500 is formed on the bush body part 100 so as to protrude to the outside more than the first uneven part 200, and the bush body part 100 has an installation groove 110 in which the O-ring 500 is installed.

FIG. 9 is a graph comparatively illustrating results obtained by measuring radial stiffness of the rack bush of the steering device for a vehicle in accordance with the embodiment of the present disclosure and radial stiffness of the conventional rack bush.

Referring to FIG. 9, the results obtained by measuring the radial stiffness of the rack bush I in accordance with the embodiment of the present disclosure and the radial stiffness of the conventional rack bush II show that the stiffness of the rack bush I was increased in a low-load region (the slope of the graph of the rack bush I in accordance with the embodiment of the present embodiment was increased more than the slope of the graph of the conventional rack bush II), and low-load stiffness was continuously maintained in a high-load region such that the damping performance was improved. The improvement in the damping performance could reduce a displacement difference (hysteresis) G at a load 'O'.

The graph shows that the conventional rack bush II exhibits the damping effect by the O-ring up to a predetermined load region, but has high stiffness in the high-load region [the plastic member of the conventional rack bush II is completely pressed].

In accordance with the embodiment of the present disclosure, the rack bush may have a structure in which the uneven part is applied to the outer circumferential surface and the O-ring is mounted on the circumference of the uneven part. Thus, the rack bush can improve the deformation, noise and vibration of the rack bar in a low load region, and damp an impact transferred to the rack bar and reduce noise in a high load region.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A rack bush of a steering device for a vehicle, comprising:
    a bush body part installed in a rack housing of the steering device for the vehicle so as to cover a rack bar, and configured to guide the rack bar to move in an axial direction;
    a first uneven part formed in an uneven shape on an outer circumferential surface of the bush body part, and configured to bring the bush body part and the rack housing into line contact with each other;
    a position fixing part formed at one end of the bush body part, and configured to prevent the bush body part from moving in the axial direction; and
    an O-ring installed on the bush body part so as to protrude to the outside more than the first uneven part.

2. The rack bush of claim 1, wherein the first uneven part is formed in a wave shape in a circumferential direction of the bush body part, and has a plurality of first protrusions brought into line contact with an inside of the rack housing.

3. The rack bush of claim 2, wherein the first uneven part is made of an elastically deformable material to change a distance between the first protrusions adjacent to each other.

4. The rack bush of claim 3, wherein the first uneven part has a first groove between the first protrusions adjacent to each other.

5. The rack bush of claim 3, wherein the first uneven part is formed as one body with the bush body part.

6. The rack bush of claim 1, further comprising a second uneven part formed in an uneven shape on the inner circumferential surface of the bush body part, and configured to bring the bush body part and the rack bar in line contact with each other.

7. The rack bush of claim 6, wherein the second uneven part is formed in a wave shape in a circumferential direction of the bush body part, and has a plurality of second protrusions brought into line contact with an outer circumferential surface of the rack bar.

8. The rack bush of claim 7, wherein the second uneven part is made of an elastically deformable material to change a distance between the second protrusions adjacent to each other.

9. The rack bush of claim 8, wherein the second uneven part has a second groove between the second protrusions adjacent to each other.

10. The rack bush of claim 8, wherein the second uneven part is formed as one body with the bush body part.

11. The rack bush of claim 1, wherein the bush body part has an installation groove formed on the outer circumferential surface thereof, such that the O-ring is installed in the installation groove.

* * * * *